C. F. RICHARDSON.
VENDING MACHINE.
APPLICATION FILED DEC. 31, 1910. RENEWED APR. 3, 1915.
1,215,862.
Patented Feb. 13, 1917.
9 SHEETS—SHEET 1.
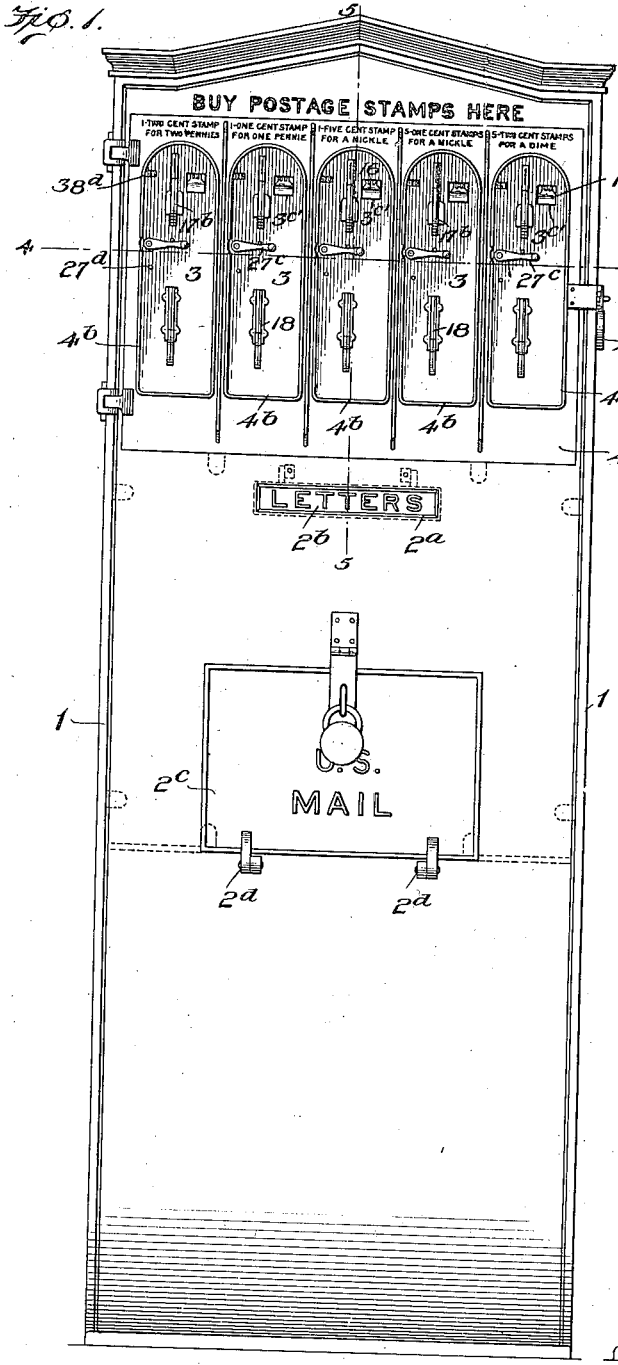
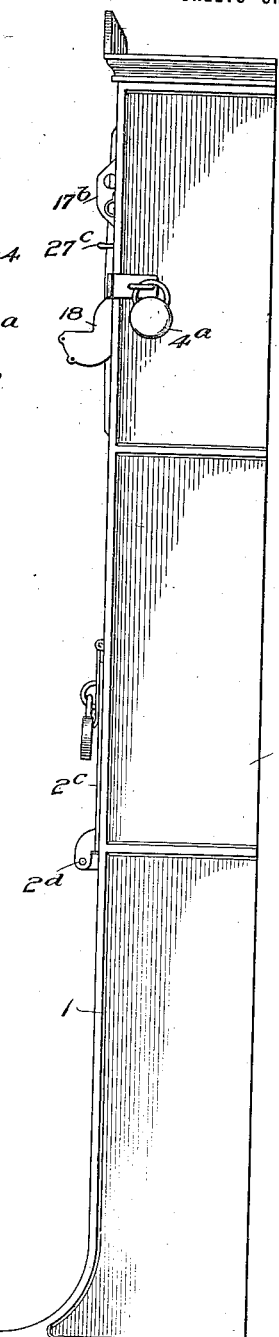

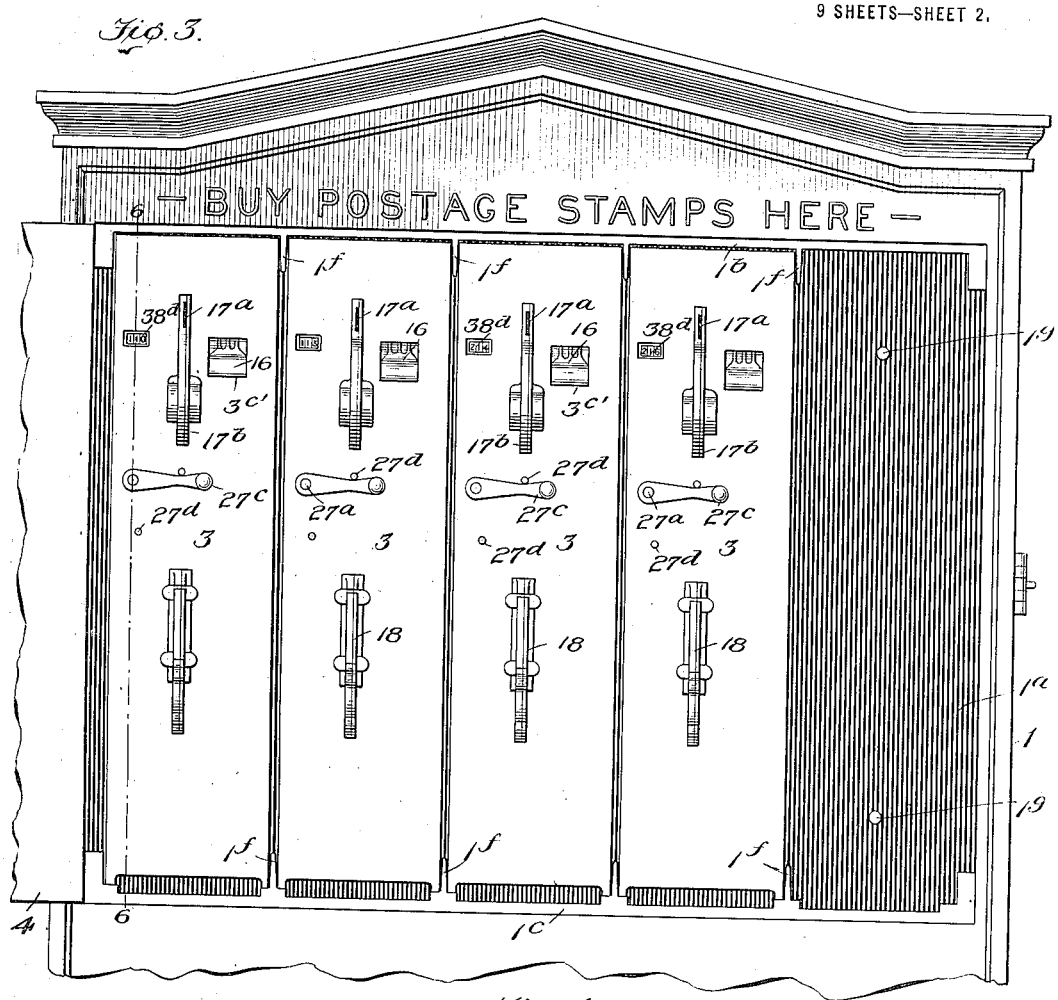
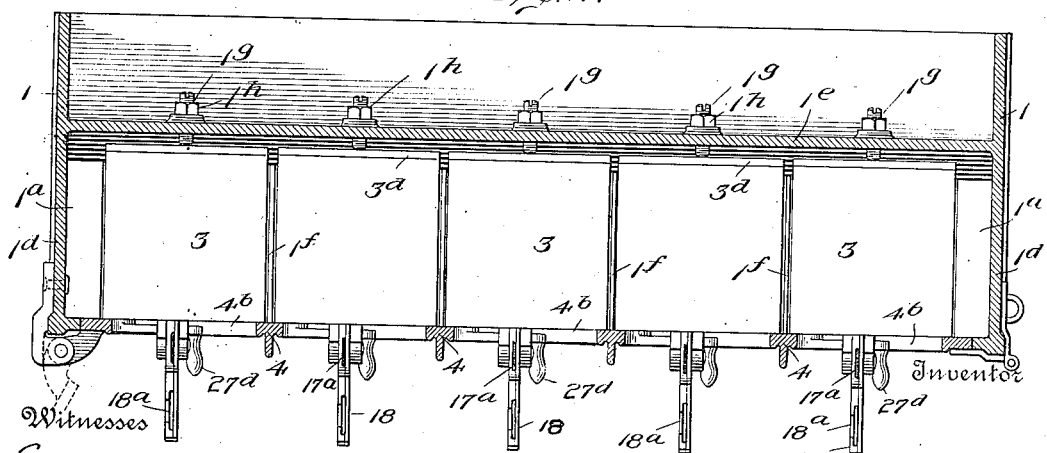

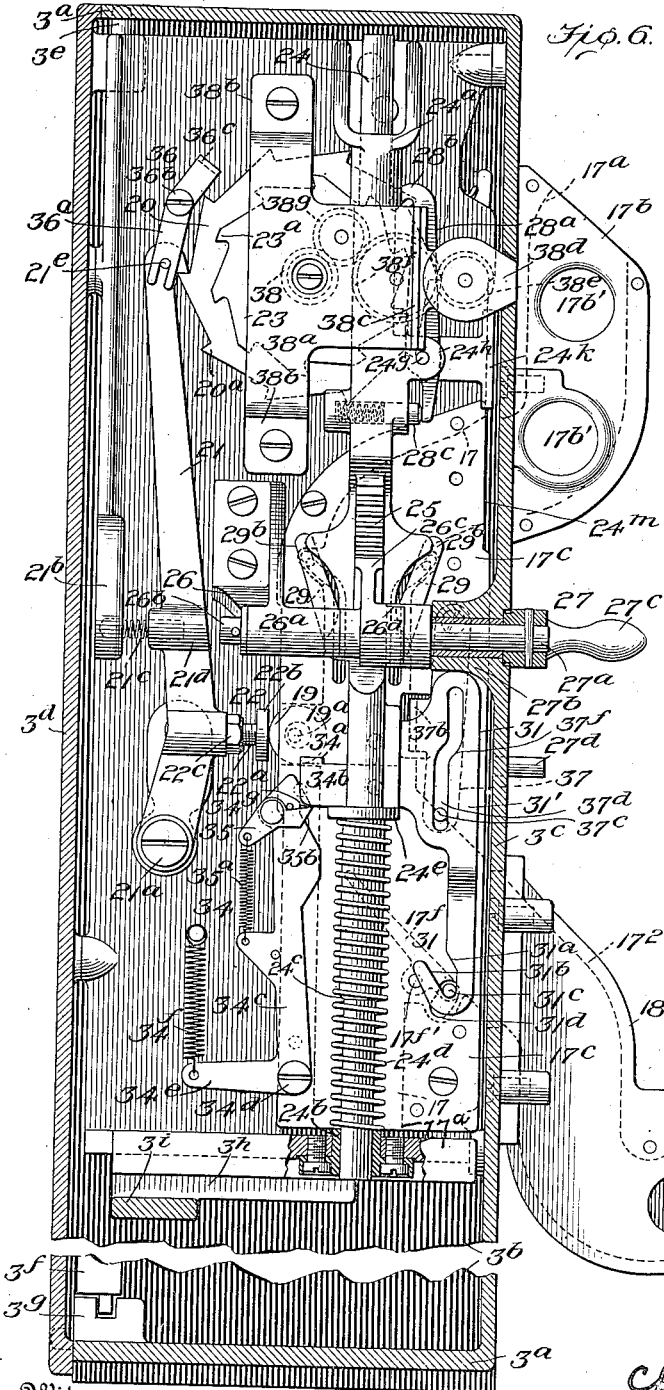

C. F. RICHARDSON.
VENDING MACHINE.
APPLICATION FILED DEC. 31, 1910. RENEWED APR. 3, 1915.
1,215,862.
Patented Feb. 13, 1917.
9 SHEETS—SHEET 4.
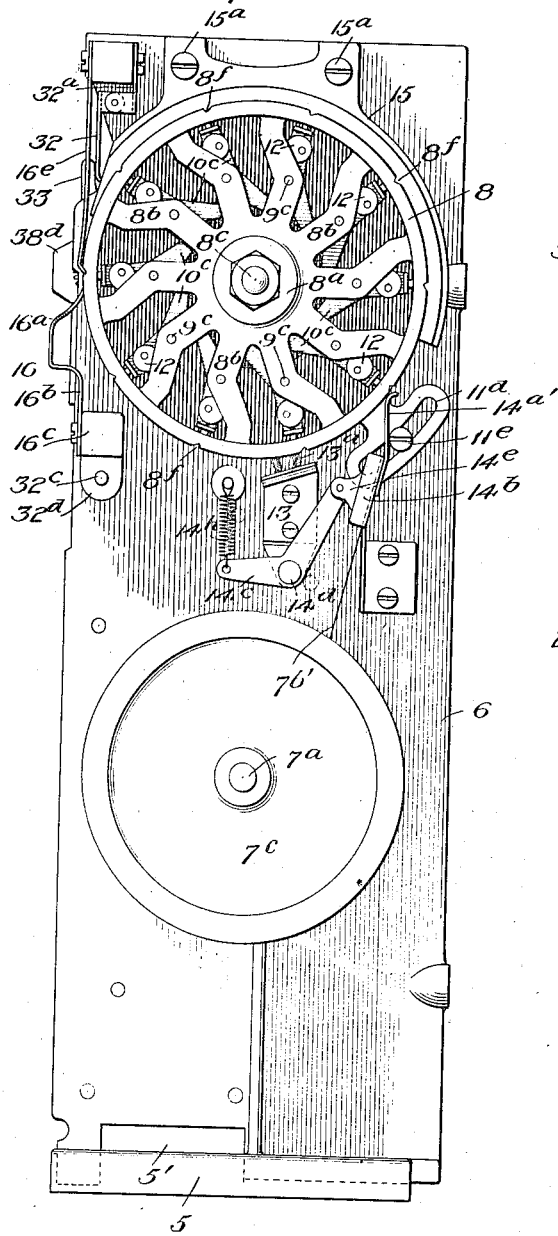
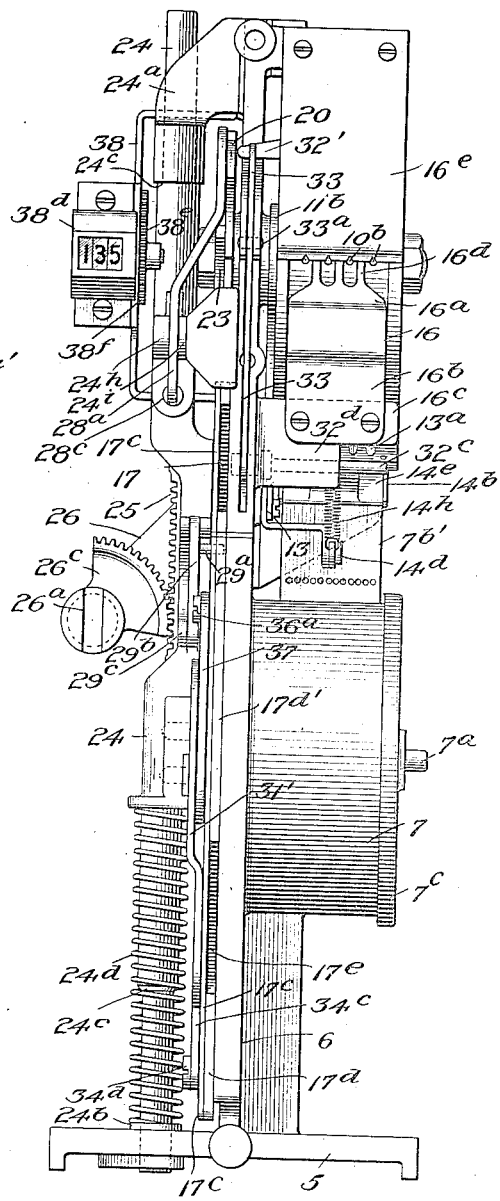

C. F. RICHARDSON.
VENDING MACHINE.
APPLICATION FILED DEC. 31, 1910. RENEWED APR. 3, 1915.
1,215,862.
Patented Feb. 13, 1917.
9 SHEETS—SHEET 5.
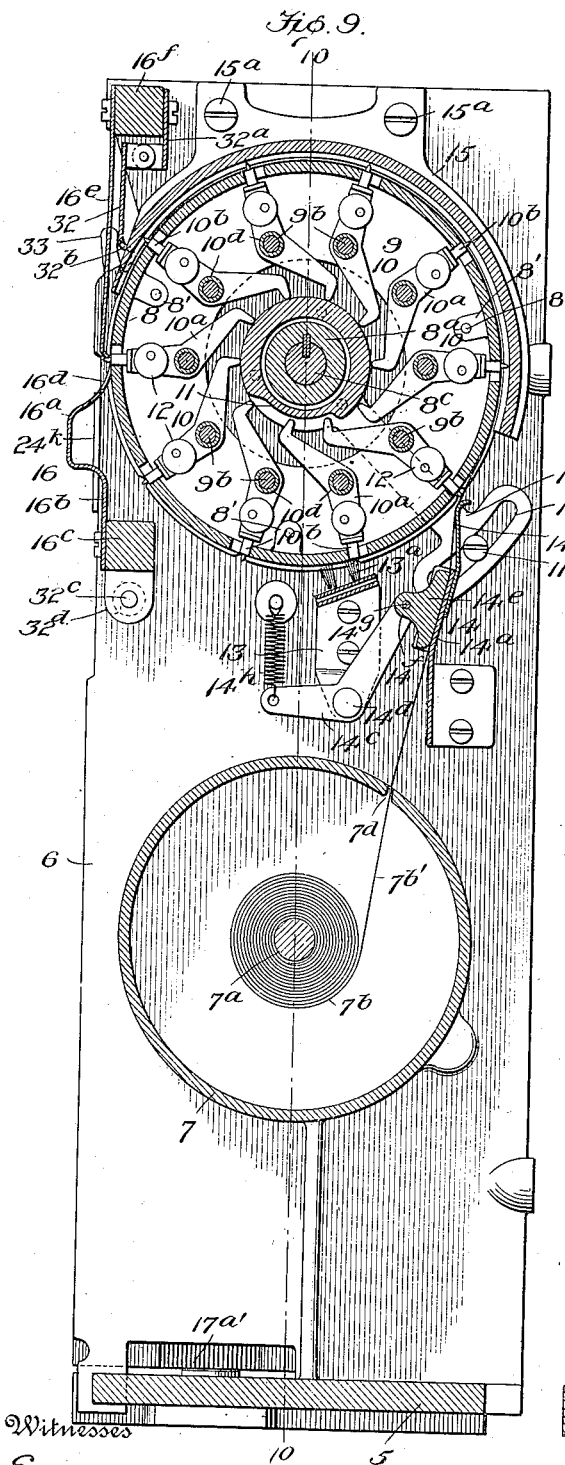
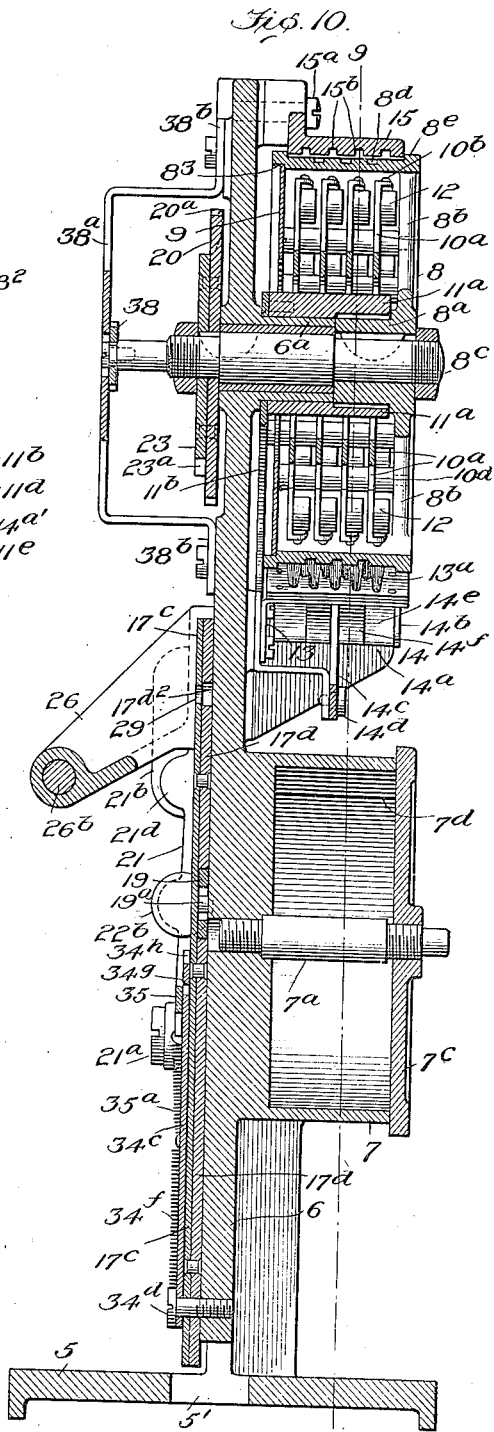

C. F. RICHARDSON.
VENDING MACHINE.
APPLICATION FILED DEC. 31, 1910. RENEWED APR. 3, 1915.
1,215,862.  
Patented Feb. 13, 1917.  
9 SHEETS—SHEET 6.
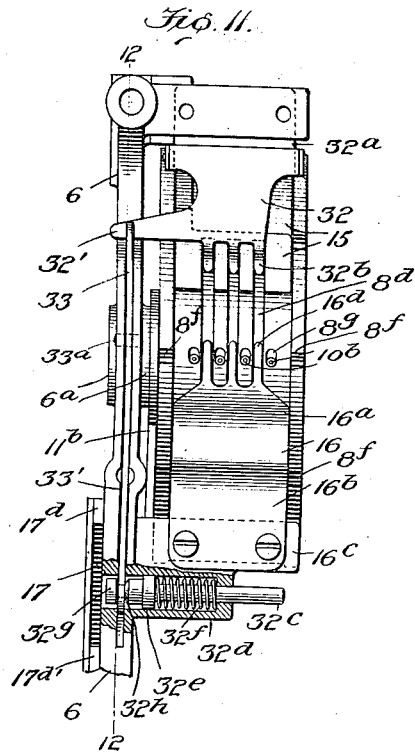
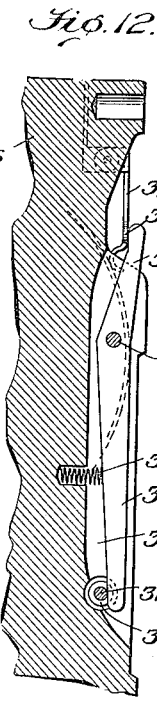
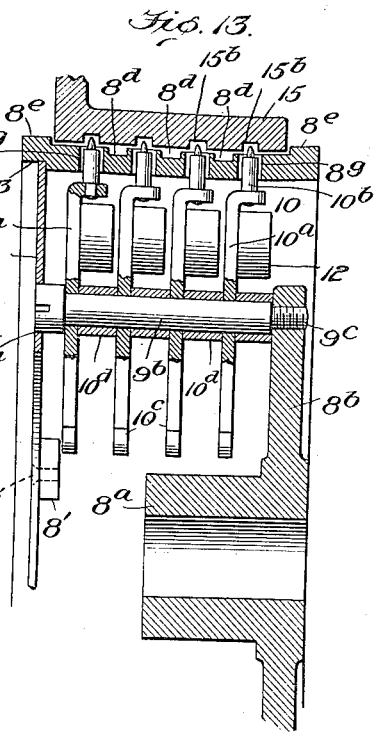
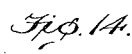
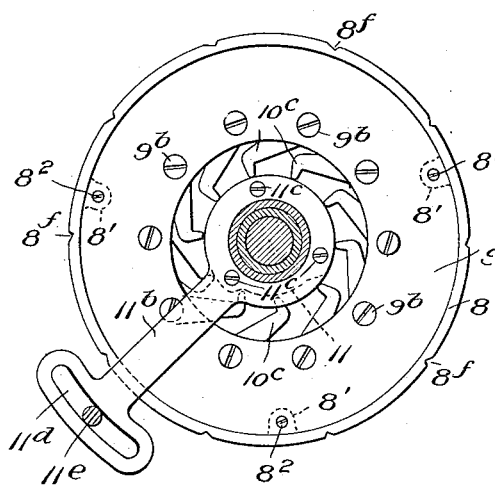
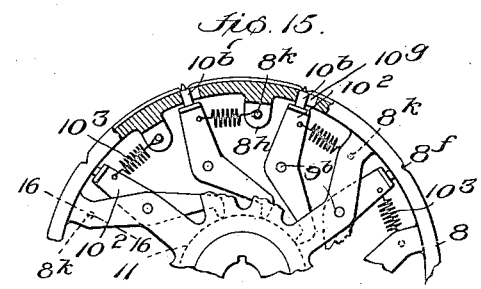
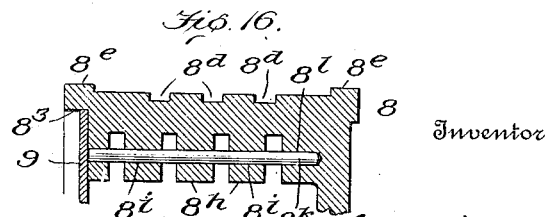

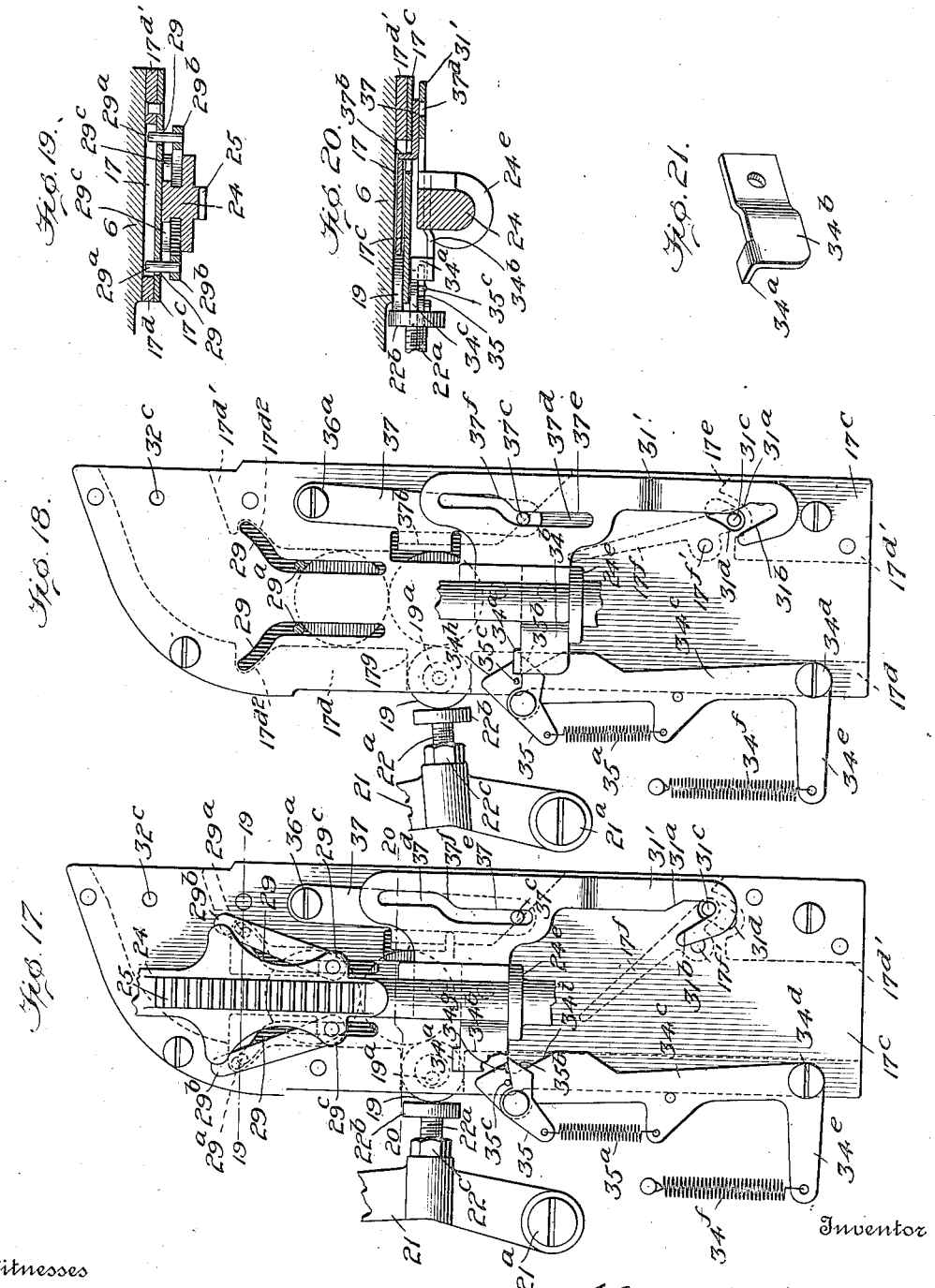

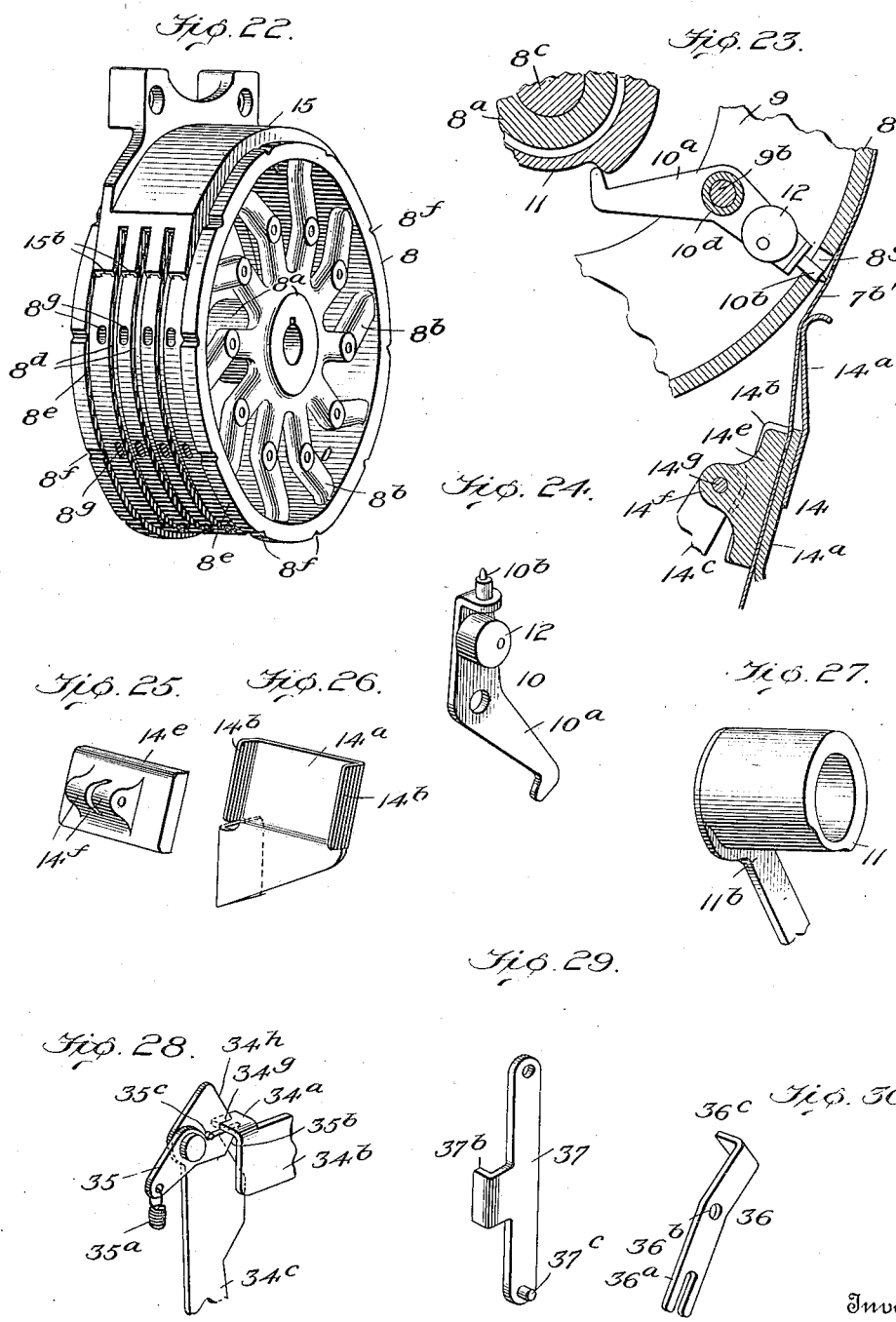

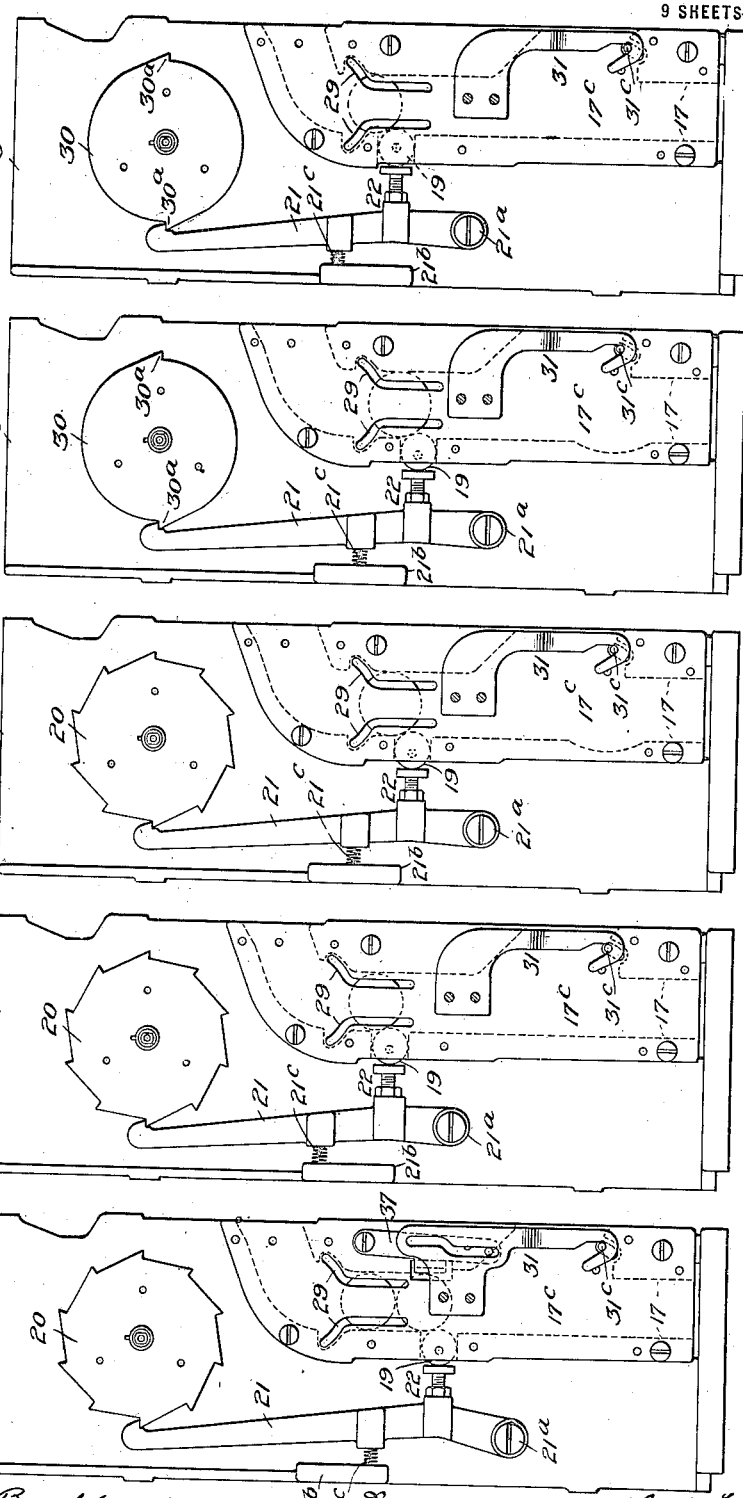

UNITED STATES PATENT OFFICE.

CHARLES FRANCIS RICHARDSON, OF WOONSOCKET, RHODE ISLAND, ASSIGNOR, BY MESNE ASSIGNMENTS, TO GEORGE B. PITTS, TRUSTEE, OF CLEVELAND, OHIO.

VENDING-MACHINE.

1,215,862.      Specification of Letters Patent.      Patented Feb. 13, 1917.

Application filed December 31, 1910, Serial No. 600,254. Renewed April 3, 1915. Serial No. 19,036.

*To all whom it may concern:*

Be it known that I, CHARLES F. RICHARDSON, a citizen of the United States, residing at Woonsocket, in the county of Providence and State of Rhode Island, have invented certain new and useful Improvements in and Relating to Vending - Machines, of which the following is a specification.

This invention relates to vending machines, the delivery mechanism of which is adapted to deliver stamps, tickets, checks or the like, or portions of a strip of material.

For the purpose of illustration, I have, in the accompanying drawings, shown and herein described one form of vending mechanism embodying my invention.

Figure 1 is a front elevation of a casing supporting a plurality of vending machines or units embodying my invention.

Fig. 2 is a side elevation of the casing.

Fig. 3 is a front view of the upper part of the casing, with the door of the casing open to illustrate the position of the vending machines or units, one of the latter being omitted.

Fig. 4 is a horizontal section through the casing on the line 4—4 of Fig. 1.

Fig. 5 is a vertical section on the line 5—5 of Fig. 1.

Fig. 6 is a section, enlarged, through one of the units on the line 6—6 of Fig. 3, showing the coin control mechanism in side elevation.

Fig. 7 is a side elevation of the vending apparatus removed from the unit casing or section and showing the delivery mechanism in side elevation.

Fig. 8 is a front elevation of the parts shown in Fig. 7.

Fig. 9 is a section on the line 9—9 of Fig. 10.

Fig. 10 is a section on the line 10—10 of Fig. 9.

Fig. 11 is a front view of the upper portion of the delivery mechanism, the stamp separator or cutter being removed to illustrate the means for controlling the coin way or opening.

Fig. 12 is a section on the line 12—12 of Fig. 11.

Fig. 13 is a transverse section, enlarged, through a portion and certain parts of the delivery drum or wheel.

Fig. 14 is a view of the delivery wheel, cam, and cam adjusting bar from the left side of Fig. 13.

Fig. 15 is a view of a portion of the delivery drum or wheel and the perforation finders showing a slightly modified form thereof.

Fig. 16 is a fragmentary section, enlarged, on the line 16—16 of Fig. 15.

Fig. 17 is a side elevation of a portion of the coin control mechanism showing the form of coin control mechanism for delivering a two-cent stamp by the insertion of two pennies.

Fig. 18 is a view similar to Fig. 17 with certain parts in a different position, and also broken away for the purpose of clearly illustrating the operation.

Fig. 19 is a section on line 19—19 of Fig. 17.

Fig. 20 is a section on line 20—20 of Fig. 17.

Fig. 21 is a detail view of a part of the plunger locking means.

Fig. 22 is a perspective view of the delivery drum or wheel.

Fig. 23 is an enlarged fragmentary sectional view of the delivery wheel, showing the operation of one of the perforation finders.

Figs. 24 to 30 are detail views.

Fig. 31 is a side view of the coin control mechanism adapted for the delivery of one two-cent stamp upon the insertion of two pennies, the plunger mechanism being omitted.

Fig. 32 is a side elevation similar to Fig. 31 but adapted for the delivery of one one-cent stamp by the insertion of one penny.

Fig. 33 is similar to Fig. 32 but shows the parts adapted for the delivery of one five-cent stamp upon the insertion of one five-cent piece.

Fig. 34 is a view showing the parts adapted for the delivery of five one-cent stamps upon the insertion of one five-cent piece.

Fig. 35 is a view similar to Fig. 34 showing the parts adapted for the delivery of five two-cent stamps upon the insertion of one ten-cent piece.

In the drawings, 1 indicates a support, preferably comprising a casing or housing, within which is formed a chamber $1^a$ having a top wall $1^b$, a bottom wall $1^c$, side walls $1^d$ and a rear wall $1^e$.

The support 1 may be of any ordinary or preferred construction, but preferably is provided with a mail holding receptacle 2 below the chamber $1^a$. $2^a$ indicates an opening through which mail matter is inserted, such opening being closed normally by a pivoted plate $2^b$. $2^c$ indicates a door, pivoted at $2^d$, for closing an opening in the receptacle 2, which opening permits the removal of mail matter therefrom.

3 indicates a vending unit removably mounted in the chamber $1^a$. As shown in the drawings, the casing or housing 1 is preferably of a size to accommodate a series of units 3. By this arrangement, one unit may be capable of vending stamps or tickets of one denomination and another unit stamps or tickets of a different denomination.

4 indicates a hinged door for the chamber $1^a$, which door may be locked by the usual pad lock $4^a$. $4^b$ indicates a series of elongated openings, one for each unit 3, formed in the door 4, whereby the major portions of the front faces or walls thereof are exposed to view.

$1^f$ indicates guiding and spacing devices provided on the top wall $1^b$ and bottom wall $1^c$ of the chamber $1^a$. These devices properly space the units 3 relative to each other and permit them to be easily inserted and removed from the chamber $1^a$.

$1^g$ indicates abutment devices carried by the rear wall $1^e$ of the chamber $1^a$. These devices are preferably screw threaded and fitted to suitable screw threaded openings in the said rear wall $1^e$, whereby they may be adjusted. $1^h$ indicates nuts fitted to the abutments for locking them in their adjusted positions. As shown in Fig. 5, the abutments are adjusted so that the space between their inner ends and the inner face of the door 4 is substantially equal to the depth of the units, so that when the door 4 is closed, the units 3 are held rigid, the guiding and spacing devices $1^f$ operating to prevent their sidewise movement.

Each unit 3 comprises a casing having top and bottom walls $3^a$, side walls $3^b$, a front wall $3^c$, formed with a stamp delivery opening $3^{c'}$, and a rear wall, which is preferably in the form of a removable plate $3^d$. $3^e$ indicates pins carried by the plate $3^d$ at its upper end and adapted to fit suitable openings in the top wall $3^a$. $3^f$ indicates a lock carried by the plate $3^d$ and having a bolt or latch which engages a keeper $3^g$ preferably carried by the bottom wall $3^a$. The pins $3^e$ and the openings therefor, and the lock, bolt and keeper serve as one form of construction for holding the plate $3^d$ in position.

$3^h$, $3^h$, indicate a pair of ribs, supported by the opposite inner faces of the side walls $3^b$. Each rib $3^h$ is provided with suitable guide walls adapted to slidingly support a base or platform 5. $3^i$ indicates a cross rod or bar, preferably cast integral with the side walls $3^b$ of the unit casing, to keep those portions of the walls adjacent to the ribs $3^h$ from bulging.

6 indicates a vertical wall or member preferably cast integral with the base 5, and extending upwardly therefrom substantially centrally of the unit casing. The wall 6 supports the stamp feed and delivery mechanism on one side thereof and the coin control mechanism, which actuates the stamp feed and delivery mechanism, on the other side thereof.

Of the strip or stamp feed and delivery mechanism, 7 is a box, preferably of cylindrical shape, secured to or formed integral with the wall 6. $7^a$ is an arbor or shaft, preferably stationary and arranged centrally of the box. The shaft $7^a$ is adapted to receive and support a roll of strip material $7^b$, (such as checks, tickets or postage stamps), which may be weakened on transverse lines. $7^c$ is a cover or end plate for the box fitted on the screw threaded end of the shaft $7^a$. $7^d$ is an elongated slot formed in the wall of the box 7 through which opening the strip $7^{b'}$ is drawn by the feed and delivery mechanism.

8 indicates a strip delivery drum or wheel having a hub $8^a$ and spokes $8^b$ which connect with the hub $8^a$ at one end thereof. $8^c$ indicates a shaft mounted in a suitable bearing $6^a$ in the wall 6 and preferably extending laterally therefrom at either side. The drum or wheel 8 is fixed to the shaft $8^c$ and is driven or rotated thereby intermittently, as will be later described. $8'$ indicates a plurality of lugs extending inwardly from the inner surface of the delivery wheel 8 near that edge opposite to the spokes $8^b$. These lugs $8'$ are preferably formed with screw threaded openings to receive screws $8^2$, which secure an annular cap or plate 9 to the wheel. The wheel 8 is preferably rabbeted, as shown at $8^3$ to form a suitable seat for the plate 9. $9^a$ indicates a series of openings formed in the plate 9, which openings are arranged concentrically of the axis of the wheel 8. $9^b$ indicates a series of transverse shafts, preferably in the form of bolts, carried by the wheel 8. One end of each bolt is reduced and provided with screw threads, as shown at $9^c$, and fitted to a suitable screw threaded opening formed in each spoke $8^b$, and the opposite end, or head, thereof is supported in one of the openings $9^a$ of the plate 9.

$8^d$, $8^d$, $8^d$, are spaced circumferential grooves formed in the feed drum or wheel 8, which at either side is flanged, as indicated at $8^e$. At regular intervals these flanges are notched or recessed, as indicated at $8^f$, the notches on one flange being alined with the notches on the opposite flange and the notches being spaced apart on the said flanges the distance occupied by each of the stamps on the periphery of the drum or wheel.

8ᵍ indicates sets of elongated openings formed in the wheel 8, the openings comprising each set being arranged side by side, as clearly shown in Figs. 11 and 22.

10 indicates sets of perforation finding devices, one set for each set of openings, and adapted to move relative to the drum or wheel 8 and strip in order to "find" the perforations between the adjoining ends of two stamps, checks or tickets one to another. There are preferably four devices 10 to each set, as shown in Fig. 13. Each device 10 preferably comprises an arm or lever 10ᵃ loosely pivoted upon the adjacent shaft 9ᵇ, a pin 10ᵇ at the free end of the lever 10ᵃ, which pin projects through the adjacent opening 8ᵍ in and slightly beyond the outer surface of the wheel 8, and a tail piece 10ᶜ which rides on a normally stationary cam 11, (Fig. 9), the latter effecting the movement of the pin 10ᵇ longitudinally of the adjacent opening 8ᵍ.

As shown in the drawings, when the pins 10ᵇ of each adjacent set of finders 10 are in operative position, that is, at the forward end of the adjacent openings 8ᵍ, they are in line with two alined notches or recesses 8ᶠ.

10ᵈ indicates spaces or washers mounted on each shaft 9ᵇ and interposed between adjacent arms or levers 10ᵃ and between each wheel spoke 8ᵇ and the adjacent lever 10ᵃ to keep the arms or levers in properly spaced position along said shafts 9ᵇ.

The cam 11 preferably comprises a sleeve 11ᵃ adjustably mounted on the sleeve or outer wall for the bearing 6ᵃ. 11ᵇ indicates a bar, which is fixed to the sleeve 11ᵃ by screws 11ᶜ. This bar extends radially of the delivery wheel, and is preferably enlarged at its free end and formed with an elongated curved opening or slot 11ᵈ. 11ᵉ indicates a set screw, adapted to a suitable opening in the vertical member 6 and arranged to secure the bar 11ᵇ thereto. By loosening the set screw 11ᵉ, and moving the bar in one direction or the other, the cam 11 may be adjusted on the bearing hub within certain limits and thus effect the swinging of the devices 10 at one point or another during the revolution of the wheel 8, the purpose of which will be later described.

12 indicates a weight carried by each perforation finding device 10, and so arranged relative to the pivot thereof as to maintain the pin 10ᵇ at the rear end of the adjacent opening 8ᵍ during a portion of its movement about the axis of the wheel 8. Preferably, the cam 11 is arranged so that when each device 10 is at its lowermost position, it is free to swing about its pivot, and then as said device 10 moves upwardly with the drum 8 about the axis thereof, the weight 12 on the device will cause it to swing in a clockwise direction, as viewed in Fig. 9, and move the adjacent pin 10ᵇ to the rear end of its slot 8ᵍ.

As shown in Figs. 9 and 23, the strip 7ᵇ′ is delivered substantially tangentially to the surface of wheel 8 on that side which moves upwardly, and the cam 11 is positioned to move the pins 10ᵇ forwardly relative to the wheel 8 and the strip 7ᵇ′ at approximately the same time that the strip engages with the wheel. As will be understood, when the pins 10ᵇ are in inoperative position or at the rear end of the openings 8ᵍ, they are behind or rearward of the perforations of the strip. As the pins 10ᵇ move forwardly, which movement is at a speed slightly greater than the speed of the strip 7ᵇ′, they automatically "find" or move into registry with and enter the said perforations.

13 indicates a bracket suitably supported by the wall 6. 13ᵃ indicates one or more brushes or sets of fibers projecting upwardly into the path of the pins 10ᵇ. These brushes operate to clean the pins prior to their engagement with the stamp strip and are preferably arranged relatively to the cam 11 so that they will positively swing the pins 10ᵇ rearwardly prior to their operation of finding and entering the perforations between adjoining stamps, checks or tickets, without materially retarding the movement of the wheel 8.

14 indicates devices for guiding and tensioning the strip 7ᵇ′ as it is delivered from the stamp roll box 7 to the delivery wheel 8. Of these devices, 14ᵃ indicates a flat bearing plate preferably provided with flanges or side walls 14ᵇ which guide the strip 7ᵇ′ to the wheel. The plate 14ᵃ is secured to the wall 6 in any well known manner. 14ᶜ indicates a lever or arm freely pivoted on a stub shaft 14ᵈ which is suitably supported by the vertical wall 6. 14ᵉ indicates a shoe adapted to engage with the strip 7ᵇ′ and press it against the bearing plate 14ᵃ. The shoe 14ᵉ may be provided with a pair of apertured lugs 14ᶠ, between which one end of the lever 14ᶜ is arranged, a pin 14ᵍ being provided for pivotally connecting the shoe and lever together.

14ʰ indicates a spring which is connected at one end to the end of the lever 14ᶜ that is opposite to the shoe carrying end. The opposite end of the spring is secured to some suitable connection on the wall 6. As will be clearly understood, the shoe 14ᵉ is yieldingly held against the strip 7ᵇ′ by the spring 14ʰ with sufficient force to permit the proper feeding of the strip 7ᵇ′ to the delivery wheel 8, when the latter is operated, without causing a separation or breaking of the said strip. 14ᵃ′ indicates an auxiliary strip guide extending upwardly from the plate 14ª and arranged to support the stamp strip 7ᵇ′ in close proximity to the wheel 8 as it is fed thereto.

15 indicates a curved strip guide fixed to the wall 6 by screws 15ª and extending around a portion of the circumference of the delivery wheel 8, but spaced therefrom slightly to permit the strip 7ᵇ′ to freely feed around the wheel to the delivery opening 3ᶜ′ in the front wall 3ᶜ of the unit 3. The guide 15 is of a width to fit between and slightly below the upper surfaces of the flanges 8ᵉ of the wheel 8 and thus prevents the strip 7ᵇ′ from running off the wheel. The guide 15 is provided with spaced longitudinal grooves 15ᵇ to receive the free ends of the pins 10ᵇ.

16 indicates a delivery device, the purpose of which is to guide the stamp, check or ticket at the free end of the strip 7ᵇ′ outwardly through the opening 3ᶜ′, as the strip is moved forwardly by the wheel 8. This device preferably comprises an inclined plate 16ª extending outwardly and downwardly relative to the delivery wheel 8. The plate 16ª has an inwardly turned member 16ᵇ which is secured to a laterally extending support 16ᶜ. The upper or free end of the plate 16ª is preferably provided with fingers or projections 16ᵈ which run in the grooves 8ᵈ. By this construction, it will be seen that as each succeeding stamp, check or ticket of the strip 7ᵇ′ reaches a point substantially opposite the opening 3ᶜ′ it engages with the plate 16ª and is guided outwardly thereby through the opening 3ᶜ′ where it can be grasped and removed or disconnected from the strip.

16ᵉ indicates a stamp, check or ticket separator or cutter preferably comprising a plate extending downwardly from a support 16ᶠ, with its lower or cutting edge in front of the drum or wheel 8 and opposite the delivery opening 3ᶜ′. The plate 16ᵉ is preferably formed from resilient sheet metal so that its cutting edge, which is bent inwardly slightly, is normally pressed against the wheel 8. The plate may extend entirely across the face of the wheel 8. When so constructed it rides on the flanges 8ᵉ during the rotary movement of the wheel, but when the wheel 8 stops and a portion of the strip has been delivered at the opening 3ᶜ′, the adjacent alined notches 8ᶠ which receive the free end of the cutter 16ᵉ permit its tearing or cutting edge to move into close engagement with the strip 7ᵇ′. The portion of the strip delivered at the opening 3ᶜ′ may then be readily separated from the strip along the line of perforations, the cutting edge of the separator or cutter facilitating this separation without tearing or mutilating the adjoining portion of the strip.

In Figs. 15 and 16 I have illustrated a slightly modified form of delivery drum or wheel and perforation finding devices. Referring to these figures, 8ʰ indicates sets of lugs or projections extending inwardly from the rim of the wheel 8 and arranged side by side. Each of these lugs is formed with an opening 8ⁱ alined with the openings 8ⁱ of the adjacent lugs 8ʰ. 8ᵏ indicates a pin or rod extending through the openings 8ⁱ of each set of lugs. Preferably, one end of the pin 8ᵏ extends into a socket 8ˡ formed in the lug at one side of the wheel 8 and its opposite end lies substantially flush with outer face of the lug 8ʰ at the opposite side of the wheel. By this construction it will be seen that the plate 9 which is seated against the outermost lugs 8ʰ locks the pins 8ᵏ in position.

10² indicates sets of perforation finding devices pivotally mounted upon the transverse shafts 9ᵇ and each provided with a pin 10ᵇ. 10³ indicates a series of coiled springs one for each finder 10², one end of each spring being connected to an adjacent perforation finder 10² and its opposite end secured to or wrapped around the adjacent pin 8ᵏ. The springs 10³ operate to normally maintain the pins 10ᵇ, carried by the finders 10², at the rear ends of the openings 8ᵍ, but when the tails of the finders 10² ride the cam 11, the pins 10ᵇ move forward to the opposite or front end of the openings 8ᵍ.

As shown in Fig. 16, it will be seen that the space between the opposing faces of adjacent lugs 8ʰ is relatively small, so that the stationary ends of the springs are prevented from sliding longitudinally of the pins 8ᵏ; they are thus maintained at all times in substantially the same plane in which the finders 10² swing.

Of the coin operating and control mechanism, 17 indicates the coin slot or way, the path or direction of which is shown by dotted lines in Figs. 6, 17 and 18. The coin inlet opening to the slot 17, is indicated at 17ª, and the discharge opening is indicated at 17ª′ and registers with an opening 5′ formed in the base 5 through which opening the coins drop into the lower portion of the unit casing. The walls of a portion of the slot 17 are formed by a pair of plates 17ᵇ, 17ᵇ, which are secured to the front wall 3ᶜ of the unit casing, one of the plates being cut away to form one side wall and the opposite end walls thereof. The other portion of the slot is formed between a plate 17ᶜ and the adjacent face of the wall 6. 17ᵈ, 17ᵈ′, indicate side plates interposed between the plate 17ᶜ and wall 6 to form the opposite end walls of the slot.

17ᵉ indicates a branch slot or chute leading from the slot 17 to a point outside of the unit. The purpose of the chute 17ᵉ is to carry off spurious and defective coins or other devices which may be inserted in the slot 17. 17ᶠ indicates a switch normally arranged in the path of the coin through the slot 17 and adapted to guide the coin into the chute 17$^e$. The switch 17$^f$ is pivoted on a pivot or shaft 17$^{f'}$ mounted in the plate 17$^c$ and wall 6, and it is thrown out of the path of the coin or coins through the slot 17 automatically when proper or good coins are inserted therein, as will be hereinafter described.

18, 18, indicate a pair of plates placed face to face and secured to the front wall 3$^c$ of the unit. One of these plates is cut away to form the slot 17$^2$ which is a continuation or extension of the slot 17$^e$. The slot 17$^2$ is preferably curved upwardly and one of the plates 18 is cut away as shown at 18$^a$ whereby the defective coin or device can be easily grasped and removed.

19 indicates a coin arrester slidingly mounted between the plate 17$^c$ and wall 6 intermediate the ends of the slot 17 and normally arranged to project into the slot 17. The plate 17$^d$ is cut away, as shown at 17$^g$ to form upper and lower guide walls for the said arrester and permit it to slide laterally. The arrester 19 preferably comprises a ring shaped member and surrounds a fixed pin 19$^a$ which limits its sliding movement in either direction.

20 indicates a rotary control member fixed to the shaft 8$^c$ for controlling the movement of the wheel 8. This member preferably consists of a disk or wheel having a series of ratchet teeth 20$^a$, corresponding in number to the number of sets of perforation finders 10 carried by the drum or wheel 8. 21 indicates a lock and release pawl adapted for engagement with the ratchet teeth 20$^a$. 21$^a$ indicates a shaft, or pin, preferably screw threaded to the wall 6, on which the pawl 21 is swingably supported. 21$^b$ indicates an abutment preferably comprising a projection formed integral with the wall 6 at or near its rear edge. 21$^c$ indicates a compression spring arranged between and having its opposite ends mounted in suitable recesses formed in the abutment 21$^b$ and pawl 21, the latter being enlarged at 21$^d$ to permit the formation of such recess. The spring 21$^c$ operates to normally maintain the pawl 21 in engagement with the teeth 20$^a$ of the control member 20.

22 indicates thrust devices interposed between the coin arrester 19 and the pawl 21, whereby when the coin arrester is moved laterally it, operating through the thrust devices, will swing the pawl on its pivot 21$^a$ against the tension of the spring 21$^c$ and out of engagement with the adjacent tooth 20$^a$ of the control member 20. The latter is then free to rotate. As shown in the drawings, the thrust devices 22 are connected to the pawl 21 at a point relative to its pivot so that comparatively slight movement of the coin arrester 19 will effect a long throw of the pawl 21 at its free end. By this arrangement it will be seen that the control member 20 is quickly released from the pawl. The thrust devices 22 preferably comprise a rod 22$^a$, having screw threaded connection with the pawl 21, and a bearing plate 22$^b$ with which the arrester 19 engages. This form of construction permits the thrust member to be made longer or shorter and to thus regulate the normal position of the arrester 19 in the slot or way 17 so it will extend there-across to a greater or lesser extent according to the size of the coins which it is intended to stop. As the rod 22$^a$ is capable of minute adjustments, the coin arrester 19 can be accurately regulated to arrest or stop coins of a standard size, but permit coins of slightly smaller size to pass through the slot 17 and out into the chute 17$^e$. 22$^c$ indicates a lock nut to secure the rod 22$^a$ in position.

23 indicates a driver fixed to the shaft 8$^c$ and preferably comprising a ratchet wheel having teeth 23$^a$.

24 indicates a plunger preferably mounted to slide at its upper end through an opening in a bracket 24$^a$ fixed to the wall 6 and guided at its lower end by a collar 24$^b$ which may be mounted in an opening in the base 5. The plunger 24 is preferably reduced at its upper and lower ends to form shoulders 24$^c$ which operate as stops to engage with the base 5 or collar 24$^b$ to limit the downward movement of the plunger and with the bracket 24$^a$ to limit its upward movement. 24$^d$ indicates a spring preferably coiled around the plunger 24. The lower end of the spring 24$^d$ bears against the base 5 or collar 24$^b$, while its upper end engages with a flange or extension 24$^e$; provided on the plunger 24, the spring operates to normally press the plunger upwardly with the upper shoulder 24$^c$ thereof in engagement with the bracket 24$^a$.

Any suitable means may be provided for operating the plunger 24. In the present instance I preferably provide manually operated means, of which 25 indicates a rack provided on one side and extending longitudinally of the plunger 24.

26 indicates an arm extending laterally from the wall 6 and carrying at its free end a bearing member 26$^a$. 26$^b$ indicates a rock shaft mounted in the bearing member and provided at its front end with a segmental gear 26$^c$ which meshes with the rack 25. When the gear 26$^c$ is operated, the plunger is moved downwardly against the tension of the spring 24$^d$.

27 indicates an operator for operating the gear 26$^c$. This operator preferably comprises a shaft 27$^a$ mounted in suitable bearings 27$^b$ provided in the front wall 3$^c$ of the unit, and a crank having a handle 27$^c$. The inner end of the shaft 27$^a$ is preferably provided with a key or interlocking device which fits into a recess or opening 26ᵈ, formed in the front end of the rock shaft 26ᵇ. The key and recess provide for the disconnection of the shaft 26ᵇ from the handle 27ᶜ so that the stamp delivery and control mechanisms can be removed from the unit casing and then replaced therein in a convenient manner. The normal position of the operator 27 is shown in Figs. 1, 3, 4, and 6. Stops 27ᵈ, 27ᵈ, may be provided upon the front face of the unit to limit the movement of the handle 27ᶜ in either direction.

28 indicates a reciprocating driver-engaging member adapted to engage with the teeth 23ᵃ of the driver 23, one by one, and rotate the driver the distance of one tooth each time the plunger 24 is operated in the downward direction. The reciprocating member 28 is connected to and moves with the plunger 24. It preferably comprises a lever 28ᵃ, having a dog 28ᵇ which engages with the driver teeth 23ᵃ, pivoted on a pin 24ᵍ between two projections or lugs 24ʰ, 24ⁱ, carried by the plunger 24. 28ᶜ indicates a spring pressed pin, mounted in a suitable recess in the plunger 24 and adapted to press against the tail of the lever 28ᵃ and thereby normally maintain the dog 28ᵇ in the path of the teeth 23ᵃ. By this construction, it will be understood that in the upward movement of the plunger 24 to normal position, the dog 28ᵇ rides the adjacent tooth 23ᵃ and assumes its normal position ready to engage therewith when operated the next time. Preferably, the projection 24ⁱ is extended forwardly and carries a plate 24ᵏ which, when the plunger 24 moves downwardly, closes the slot 17 and thus prevents the introduction of an additional coin or coins during the vending operation. As shown at 24ᵐ, the plate 17ᶜ is cut away to allow the plate 24ᵏ to slide downwardly.

29, 29 indicate two elongated slots formed in the plate 17ᶜ adapted to receive and guide two coin engaging devices 29ᵃ, 29ᵃ, which extend transversely across the coin way 17. The upper portions of the slots 29 curve or extend outwardly in opposite directions so that when the coin engaging devices 29ᵃ, 29ᵃ, are at the upper ends of the slots, they occupy, positions to one side and out of the path of the coins through the way 17. To permit this positioning of the coin engaging devices, the opposing walls of the plates 17ᵈ, 17ᵈ′, are cut away as shown at 17ᵈ², 17ᵈ². 29ᵇ, 29ᵇ, indicate arms or rods, each supporting at its upper or free end a coin engaging device 29ᵃ and pivoted at its opposite end to a suitable projection 29ᶜ carried by the plunger 24. When the plunger 24 is operated, the arms or levers 29ᵇ move therewith and the devices 29ᵃ, which are guided inwardly and downwardly by the walls of the slots 29, engage with the upper edges of a coin and force it or the set of coins past the coin arrester 19. The coin or coins are then free to fall into the coin receptacle, or lower portion of the unit casing.

This operation of the plunger 24 and devices 29ᵃ in forcing the coin or coins past the coin arrester 19, moves or slides the latter laterally and disengages the pawl 21 from the adjacent tooth 20ᵃ of the control member 20. At the same time the driver-engaging member 28 moves downwardly, engages with and rotates the driver 23 the distance of one tooth, such engagement taking place immediately following the release of the control member 20; the driver in turn, operating through the shaft 8ᶜ, rotates the drum or wheel 8 the distance of one stamp, check or ticket so that each time the plunger 24 is operated downwardly, one stamp, check or ticket, that is, a predetermined portion of the strip, is delivered through the delivery opening 3ᶜ′. At each operation of inserting a coin (or set of coins, such as two pennies, in the form of the invention shown in Figs. 6—17—18 and 31) and moving the plunger 24, the control member 20 is released, rotated one tooth, and then locked by the pawl 21 and remains locked until the operation is repeated.

In Figs. 34 and 35 I have shown a slightly modified form of control member which permits more than one stamp to be vended upon the insertion of one coin or set of coins, these figures representing, respectively, a machine for vending five one-cent stamps upon the insertion of a five-cent piece, and five two-cent stamps upon the insertion of a ten-cent piece.

Referring to these figures, 30 indicates a control member provided with a series of teeth 30ᵃ, which are spaced from each other a number of steps or spaces equal to the number of stamps to be vended for one coin or set of coins. Since the form of invention illustrated in Figs. 34 and 35 is adapted to deliver five stamps for each coin inserted, obviously the teeth 30ᵃ are arranged a distance equal to five stamps or spaces from each other. As the control member 20 in Figs. 6, 31, and 32 is provided with ten teeth, it will be understood that the control member 30 is therefore provided with two teeth 30ᵃ arranged diametrically opposite each other.

The operation of the apparatus in vending five stamps by the insertion of one coin may be described as follows: The coin is inserted in the opening and falls into engagement with the arrester 19. The plunger is then operated. This operation forces the coin past the arrester and disengages the pawl 21 from the adjacent tooth 30ᵃ. This operation also rotates the control member 30 one step and delivers one stamp through the delivery opening 3c'. At the end of this operation the pawl 21 returns to normal position, but as the control member is not locked thereby, the operation of depressing the plunger 24 can be repeated four times, or until the other or succeeding tooth 30a engages the pawl 21, each such operation effecting the delivery of a stamp through the delivery opening 3c'. Each of said stamps can be detached from the strip at the end of each operation or all five can be left intact until the completion of the last operation.

31 indicates means for operating the switch 17f. As has already been stated, this switch is normally arranged in the path of the coins through the slot 17. If defective coins are inserted in the slot, the switch 17f guides them into the chute 17e. When the proper size coin in inserted it is of course arrested by the arrester 19 and when the plunger 24 is depressed, the switch 17f is automatically thrown upwardly out of its path. The switch throwing means 31 preferably comprise an arm or plate 31' rigidly connected to move with the plunger 24 and provided with two inclined cams 31a, 31b. 31c indicates a pin connected with and projecting laterally from the switch 17f and movable through a slot 31d formed therefor in the plate 17c. The pin 31c is arranged in the path of the cams 31a and 31b. As will be seen from Figs. 17 and 18, when the arm or plate 31a moves downwardly, the cam 31a engaging the pin 31c moves the switch upwardly out of the path of the coin through the slot 17 and closes the entrance to the chute 17e. When the arm or plate 31a moves in the opposite direction, the cam 31b engages the pin 31c and positively throws the switch back to its normal position.

I preferably provide means for closing the coin slot 17 when the entire strip of stamps is exhausted or in case the strip becomes separated at any time and the remaining portion of the strip fails to feed forwardly to the delivery opening 3c'. These means are preferably arranged immediately behind or above the stamp delivery opening so that it will operate after or at the time the last stamp comprising the strip 7b' is delivered from the machine. Of these means, 32 indicates a plate pivoted upon a suitable support 32a carried by the wall 6. The lower end of this plate is preferably provided with a series of strip engaging fingers 32b which aline with the grooves 8d of the delivery wheel or drum 8. As shown in Fig. 12 these fingers 32b rest upon the strip 7b', but when the end of the strip is reached said fingers move inwardly into engagement with the bottom wall of the grooves 8d. 32c indicates a rod or pin slidingly mounted in a suitable recess formed in a laterally projecting member 32d which is formed integrally with the wall 6. The rod 32c is enlarged to form a collar 32e against which a spring 32f surrounding the pin 32c presses at one end, the opposite end of the spring bearing against the end wall of the recess. The spring 32f operates to press the pin longitudinally so that its head or front end 32g will extend transversely across the slot 17 and prevent the passage of coins therethrough. 32h indicates a groove or recess, preferably extending annularly around the pin 32c.

33 indicates a lever preferably mounted in an elongated recess 33' formed in the front edge of the wall 6 and mounted upon a shaft 33a extending across said recess. The upper end of this lever 33 presses against an arm 32' fixed to the plate 32 while its opposite end is adapted to fit within the groove 32h formed in the pin 32c and maintain the pin in locked position with its head to one side of the slot 17. 33b indicates a spring engaging with the lever 33 and normally tending to throw its pin engaging end outwardly. When the strip 7b' is placed in position and extends around the drum or wheel 8 to the delivery opening, the plate 32 is slightly elevated to lie in engagement with the upper surface of the strip. This forces the lower or pin engaging end of the lever 33 inwardly and thus locks the pin 32c, the latter being moved laterally for this purpose and the spring 32f compressed. When the end of the strip or the last stamp or check is reached, the movement of the fingers 32b inwardly permits the pin engaging end of the lever 33, under the action of the spring 33b, to move outwardly and thus releases the said pin. The spring 32f then moves the pin 32c across the slot 17. In case an attempt is made to insert coins and to operate the machine when the slot 17 is closed by the pin 32c, the openings 17b', 17b', formed in the plates 17b, 17b, permit the coin to be moved upwardly and taken out at the inlet opening 17a.

34 indicates means for preventing the operation of the plunger 24, and the removal of more than one stamp from the machine when one coin or set of coins is inserted. That is, the means 34 prevent the plunger 24 from being depressed partially or far enough to release the control member 20 and then reciprocated in a manner to gradually work more stamps from the machine for the price of one coin. Of these means, 34a indicates a dog carried by an arm 34b which is rigidly connected to and moves with the plunger 24. 34c indicates a lever pivoted at 34d and provided with an arm 34e. 34f indicates a spring connected at one end to the wall 6 having its opposite end connected to the arm 34e. This spring maintains the lever 34c in normal position but permits it to swing laterally. 34g indicates a shoulder provided at or near the free end of the lever 34ᶜ the purpose of which shoulder is to engage with the dog 34ᵃ and lock the plunger 24 against upward movement, when the latter is not depressed the full distance. 34ʰ indicates a cam provided on the lever 34ᶜ which cam is engaged by the dog 34ᵃ and permits the latter to swing the said lever laterally to bring the dog 34ᵃ beneath the shoulder 34ᵍ.

35 indicates a pawl or lever, pivoted on the lever 34ᶜ. One arm of the lever 35 extends beyond the end of the shoulder 34ᵍ and into the path of the dog 34ᵃ so that the latter will operate it in its downward movement.

35ᵃ indicates a spring having one end fixed to the other arm of the pawl 35 and its opposite end suitably connected to the lever 34ᶜ and operating to normally maintain the dog engaging arm thereof in the path of the dog 34ᵃ. 35ᵇ indicates a cam or inclined wall provided on the lower edge of the pawl 35 which cam is engaged by the dog 34ᵃ when the latter moves upwardly. 35ᶜ indicates a pin or stop carried by the lever 34ᶜ and operating to limit the movement of the pawl 35 in one direction. The parts of the plunger locking means 34 coöperate with each other to lock the plunger 24 in that position thereof when the pawl 21 has been disengaged from the tooth of the control member and prior to the forcing of the coin entirely past the coin arrester 19; that is, in case the plunger 24 is not operated its entire distance downwardly but only far enough to force the coin into a "dead center" position between the arrester 19 and the opposite end wall of the slot 17, these means 34 prevent the upward movement of the plunger 24 and can only be released therefrom by first depressing the plunger 24 to its fullest extent.

The plunger locking means 34 operate in the following manner: When the plunger is depressed, the dog 34ᵃ engages the cam 34ʰ and swings the lever 34ᶜ laterally until it passes below the shoulder 34ᵍ. The lever then swings back to its former position to bring the shoulder 34ᵍ in the path of the dog 34ᵃ. The dog 34ᵃ also engages with and swings the pawl 35 downwardly. If the plunger 24 is fully depressed, the pawl 35 is released and swings backwardly to normal position. Now when the spring 24ᵈ moves the plunger upwardly, the dog 34ᵃ engages with the cam or inclined wall 35ᵇ of the pawl 35, again swinging the lever 34 laterally so that it can ride past the shoulder 34ᵍ. If the plunger is depressed only partially, that is, to the position shown in Fig. 18, the dog 34ᵃ, which has been moved below the shoulder 34ᵍ (but not far enough to permit the pawl 35 to swing back to normal position), will be locked against upward movement by the said shoulder 34ᵍ. Under these conditions, the plunger can only be returned to normal position by a completion of its downward stroke. The lever 34ᶜ is preferably provided with a cam 34ⁱ which is engaged by the dog 34ᵃ to move the lever laterally and effect a quick release or disengagement of the pawl 55 from the dog 34ᵃ.

36 indicates means for engaging with the control member and preventing it from rotating more than the distance of one tooth during an operation of vending a stamp from the machine, or while it is released from the pawl 21. The purpose of these means is to prevent the operation of the controlling mechanism in such manner that the end of the stamp strip, which may be forced through the delivery opening by a partial operation of the handle 27ᶜ, can be grasped and pulled outwardly. Under such circumstances where the controlling mechanism is only partially operated, it might be possible to catch hold of the stamp strip and pull it entirely out of the machine. Of these means, 36ᵃ indicates a lock lever pivoted at 36ᵇ to the wall 6. This lever is provided at one end with a projecting lug or dog which is arranged to move into the path of the teeth 20ᵃ of the control member 20. The opposite end of the lever 36ᵃ is provided with an elongated slot in which is mounted a pin 21ᵉ carried by the pawl 21. When the pawl 21 is thrown outwardly and unlocks the control member 20, the dog 36ᶜ moves inwardly ready to engage with the next or following tooth of the control member 20. It will be understood that while the pawl is disengaged from the control member 20 the dog 36ᵃ prevents the control member from rotating except for a very short distance. The pawl 21 assumes its normal position ready to engage the next tooth following that previously released as soon as the coin has been forced past the arrester 19 and simultaneously moves the dog 36ᵃ out of the path of the tooth 20ᵃ, whereby the rotation of the feed or drum wheel 8 can be effected by the engagement of the dog 28ᵇ with a tooth 23ᵃ of the driver 23.

The machine may be adapted to vend a single stamp upon the insertion of a set of coins, for instance one two-cent stamp for two pennies (see Figs. 6—17—18—31). In operating a vending mechanism of this character, the coins are inserted separately in the slot 17, the first being stopped by the arrester 19 and the second coin, which is inserted immediately after the first coin falls, upon the upper edge thereof. The coin engaging devices 29ᵃ engage with the upper edge of the second coin and force both coins past the arrester 19. In this form of the invention the arrester 19 is arranged farther down the slot 17, to permit the positioning of two coins between it and the devices 29ᵃ, and the pawl 21 is lengthened to bring the thrust devices 22 in line with the arrester 19.

As the arrester 19 is moved back to normal position in the slot 17 by the compression spring 21ᶜ very quickly after the first inserted coin has been forced by it, I preferably provide means for enlarging the slot 17 adjacent or opposite to the arrester to permit the second coin to freely move or drop through the slot and not be stopped by the arrester. Of these means 37 indicates an arm, pivoted at 36ᵃ′ to the wall 6 and movable in a recess formed in the end wall plate 17ᵈ′. 37ᵇ indicates a flange or lip provided along one longitudinal edge of the arm 37 and adapted to form the end wall of the slot 17 opposite the arrester 19. 37ᶜ indicates a pin carried by the free end of the arm and movable in a slot 37ᵈ, preferably formed in the plate 31′, and having a straight portion 37ᵉ and a cam portion 37ᶠ. As the plate 31′ moves downwardly the pin 37ᶜ moves from end to end of the slot 37ᵈ and swings the arm 37 outwardly when the pin 37ᵉ enters the cam portion 36ᶠ. In the upward movement of the plate 31′, the arm 37 is returned to normal position. As will be understood, the cam portion 37ᶠ of the slot is arranged to operate the arm 37 and the flange 37ᵇ immediately following the movement of the first coin past the arrester. By this construction and operation the slot 17 is enlarged so that the second coin is free to move or fall downwardly behind the first coin without being stopped by the arrester 19.

The length of movement of the plunger 24 downwardly at each operation is controlled by the stop 24ᶜ near its lower end and also by the handle 27ᶜ engaging one of the stops 27ᵈ on the adjacent front wall 3ᶜ. These control devices are arranged so that in case only one coin is inserted, the plunger cannot be depressed far enough to bring the coin engaging devices 29ᵃ into engagement therewith and cause the operation of the delivery mechanism.

38 indicates a gear wheel carried by the shaft 8ᶜ near one end thereof. 38ᵃ indicates a frame supported by feet 38ᵇ at one side of the wall 6 and provided with a flange 38ᶜ. 38ᵈ indicates a register or indicating device mounted on the flange 38ᶜ. 38ᵉ indicates a gear fixed to the shaft of the register 38ᵈ. 38ᶠ, 38ᵍ, indicate intermediate or idle gears mounted on shafts which are supported by the frame 38ᵃ, and adapted to communicate the rotative movement from the gear 38 to the gear 38ᵉ. It will be understood that each time a stamp or ticket is vended from the machine, the counting device 38ᵈ is operated one point. The gear mechanism between the indicator 38ᵈ and the shaft 8ˢ is arranged to rotate the numbers backwardly, that is, to subtract one from the number shown each time the machine is operated.

When the stamp box 7 is filled, the indicator is set to show the total number of stamps placed in the machine and each time a stamp is delivered the number is reduced one unit or number. The indicator will therefore indicate at all times the number of stamps remaining in the machine.

To those skilled in the art of making vending machines of the class described, many alterations in construction and widely differing embodiments and applications of my invention will suggest themselves, without departing from the spirit and scope thereof. My disclosures and the description therein are purely illustrative, and are not intended to be in any sense limiting.

No claim is made herein to the disclosed subjects-matter relating to the coin-controlled mechanisms, coin slot closing devices and coin or slug return mechanism, the invention therein being claimed by me in a divisional application filed on the 18th day of January, 1917, Ser. No. 142,974.

What I claim is:

1. The combination of a feed or delivery wheel for a strip of material, a strip engaging member carried by said wheel and extending through the periphery thereof, means for moving said member substantially circumferentially of said wheel, and means for rotating said wheel.

2. The combination of a wheel for delivering a strip of material, said wheel being formed with an opening in its periphery, a device mounted in said opening and movable in opposite directions substantially circumferentially of the wheel for engagement with the strip of material, and means for moving the device in one direction.

3. The combination of a wheel for delivering a strip of material, said wheel being formed with an opening in its periphery, a device mounted in said opening and movable in opposite directions substantially circumferentially of the wheel for engagement with the strip of material, means for moving the device in one direction, and means for moving the device in the opposite direction.

4. The combination of a wheel for delivering a strip of material, said wheel being formed with an opening in its periphery, a device pivotally mounted on the wheel, the free end of said device being mounted in the opening in the periphery and movable substantially circumferentially of the wheel for engagement with the strip, and means for moving said device on its pivot.

5. In a machine of the class described, the combination of a delivery drum or wheel adapted to feed forwardly a strip of stamps or tickets separated by lines of perforations, spaced perforation finding devices carried by said wheel and extending beyond the periphery thereof and adapted to move in a direction substantially circumferential of the wheel to find the perforations of the strip, and means for operating the said devices successively.

6. In a machine of the class described, the combination of a delivery drum or wheel adapted to feed forwardly a strip of stamps or tickets separated by lines of perforations, spaced perforation finding devices movably carried by said wheel and extending beyond the periphery thereof, means for moving the said devices in a direction substantially circumferentially of the wheel into an inoperative position, and means for operating the devices successively in the opposite direction substantially circumferentially of the wheel.

7. In a machine of the class described, the combination of a delivery drum or wheel adapted to feed forwardly a strip of stamps or tickets separated by lines of perforations, the said drum or wheel being formed with a series of spaced openings, a series of perforation finding devices, each arranged in one of said openings and projecting beyond the periphery of said drum or wheel, means for delivering the strip to the wheel, means tending to maintain the said devices at the rear end of the openings prior to the delivery of the strip to the wheel, and means for moving the said devices substantially circumferentially of said wheel to find and enter the perforations of the strip.

8. In a machine of the class described, the combination of a delivery drum or wheel adapted to feed forwardly a strip of stamps or tickets separated by lines of perforations, the said drum or wheel being formed with a series of spaced openings, a series of perforation finding devices, each arranged in one of said openings, means for delivering a strip to the wheel, means for moving the said devices rearwardly substantially circumferentially of the wheel prior to the engagement of the strip with the said drum or wheel, and means for moving the said devices in the opposite direction substantially circumferentially of the wheel to find and enter the perforations of the strip.

9. In a machine of the class described, the combination of a delivery drum or wheel adapted to feed forwardly a strip of stamps or tickets separated by lines of perforations, the said drum or wheel being formed with a series of spaced openings, a series of perforation finding devices, each projecting through one of said openings, means for delivering the strip to the wheel, means for moving the said devices in one direction substantially circumferentially of the wheel prior to the engagement of the strip with the said drum or wheel, and a cam for operating the said devices in the opposite direction substantially circumferentially of said wheel.

10. In a machine of the class described, the combination of a delivery drum or wheel adapted to feed forwardly a strip of stamps or tickets separated by lines of perforations, the said drum or wheel being formed with a series of spaced openings, a series of perforation finding devices, each arranged in one of said openings, means for delivering the strip to the wheel, means for moving the said devices in one direction substantially circumferentially of said wheel prior to the engagement of the strip with the said drum or wheel, a cam for operating the said devices in the opposite direction substantially circumferentially of the wheel, and means for adjusting the said cam.

11. The combination of a strip feed and delivery wheel, a support therefor, means for rotating the said wheel, means for delivering to said wheel a strip of material formed with weakened transverse lines, a series of devices carried by said wheel and projecting from the periphery of said wheel, the said devices being mounted to move in opposite directions substantially circumferentially relative to the wheel, means for moving the said devices substantially circumferentially of the wheel in one direction into an inoperative position prior to the delivery of the strip to the wheel, and means for operating the said devices in the opposite direction substantially circumferentially of the wheel successively to find the weakened lines in the strip.

12. The combination of a strip feed wheel, a support therefor, means for rotating said wheel, means for delivering to said wheel a strip of material formed with weakened transverse lines, a series of devices carried by said wheel and projecting from the periphery thereof, the said devices being mounted to move in opposite directions substantially circumferentially of the rim of said wheel, means for moving the said devices in one direction substantially circumferentially of the wheel into an inoperative position prior to the delivery of the strip to the wheel, and means for successively moving the said devices in the opposite direction substantially circumferentially of the wheel to find the weakened lines in the strip, one of said moving means being carried by said support.

13. The combination of a strip feed and delivery wheel, a support therefor, means for rotating the said wheel, means for delivering to said wheel a strip of material formed with weakened transverse lines, a series of devices carried by said wheel and extending from the periphery thereof, the said devices being mounted to move in opposite directions substantially circumferentially of the wheel, means arranged within the wheel for moving the said devices in one direction into inoperative position prior to the delivery of the strip of material to the said wheel, auxiliary means supported by the wheel support for moving the said devices into an inoperative position prior to the delivery of the strip of material to the wheel, and means for operating the said devices successively in the opposite direction to find the weakened lines in the said strip.

14. In a machine of the class described, the combination of a delivery drum or wheel adapted to feed forwardly a strip of stamps or tickets separated by lines of perforations, spaced perforation finding devices carried by said wheel and adapted to move in opposite directions substantially circumferentially of the wheel, whereby when said devices move in one direction they engage the perforations of the strip, means for successively operating the said devices in one direction, and a strip guide extending circumferentially of the wheel.

15. In a machine of the class described, the combination of a delivery wheel adapted to feed forwardly a strip of stamps or tickets separated by lines of perforations, spaced perforation finding devices carried by said wheel and adapted to move in opposite directions substantially circumferentially of the rim of said wheel, whereby when said devices move in one direction they engage the perforations of the strip, means for successively moving said devices in opposite directions, and a strip guide extending circumferentially of the wheel.

16. In a machine of the class described, the combination of a delivery drum or wheel adapted to feed forwardly a strip of stamps or tickets separated by lines of perforations, spaced perforation finding devices carried by said wheel and adapted to move relative thereto to find the perforations of the strip, means for successively operating the said devices, and strip tensioning means comprising a plate and a spring pressed shoe, for tensioning the strip as it is delivered to said wheel.

17. The combination of a strip feed or delivery wheel, mechanism for operating the wheel, a series of transverse shafts carried by the wheel and arranged concentrically to the axis of the wheel, a series of sets of strip engaging devices, the free ends of which are arranged in openings formed in the rim of said wheel, the devices of each set being pivotally mounted on one of said shafts, means for delivering a strip of material to the wheel, and means for operating the said devices about their pivots at a predetermined point during the revolution of the wheel.

18. The combination of a strip feed and delivery wheel, formed with a series of openings, mechanism for operating the said wheel, means for delivering a strip of material having perforations to permit its separation along transverse lines, a series of pivoted levers one end of each of which extends through one of the openings, and a cam with which the opposite end of each of said levers engages, whereby that end of the lever which extends through an adjacent opening is moved substantially circumferentially of the wheel into a perforation of the strip.

19. The combination of a strip feed and delivery wheel, formed with a series of openings, mechanism for operating the said wheel, means for delivering a strip of material having perforations to permit its separation along transverse lines, a series of devices carried by and having movement relative to said wheel for finding the said perforations, a cam for operating the said devices successively, each of the devices comprising a pivoted lever carrying a member extending through the adjacent opening in the wheel and arranged to project into a perforation in the strip, a tail piece engaging with the said cam, and a weight carried by each of said devices for moving the said device into an inoperative position prior to the feeding of the strip to the wheel.

20. In a machine of the class described, the combination of a feed or delivery wheel formed with a series of openings, mechanism for rotating said wheel, means for delivering a strip of material to said wheel, devices, projecting through said openings and arranged to enter the perforations in the stamp strip when in registry therewith, and means for moving the said devices relative to the said wheel and said strip as the latter is fed thereto, to bring the said devices into registry with the perforations.

21. The combination of a plunger, lock and release means for controlling the operation thereof, a dog carried by said plunger, a swingable member having a shoulder normally arranged in the path of said dog, means coöperating with the dog for swinging said member laterally during downward movement of the plunger, and means coöperating with said dog for swinging the said member laterally during upward movement of the plunger when the latter has been moved its entire distance.

22. In mechanism of the class described, the combination of a plunger, lock and release means for controlling the operation of said plunger, a dog carried by said plunger, a swingable member having a shoulder normally arranged in the path of said dog and means coöperating with the dog to swing said member laterally during downward movement of the plunger, and means coöperating with said dog for swinging the said member laterally during the upward movement of the plunger when the latter has been moved its entire stroke.

23. In mechanism of the class described, the combination of a plunger, lock and release means for controlling the operation of said plunger, a dog carried by said plunger, a swingable member having a shoulder normally arranged in the path of said dog and means coöperating with the dog to swing said member laterally during downward movement of the plunger, and means carried by said member and arranged to be acted on by said dog for swinging the member laterally during upward movement of the plunger when the latter has been moved its entire stroke.

24. In a control mechanism for a machine of the class described, the combination of a plunger, lock and release means for said plunger, a dog carried by the plunger, and a pivoted lever provided with a shoulder normally arranged in the path of the said dog, but adapted to swing laterally to permit the dog to ride past the shoulder when operated, the said dog and shoulder operating to lock the plunger against rearward movement when moved less than its entire distance.

25. In a control mechanism for a machine of the class described, the combination of a plunger, lock and release means for said plunger, a dog carried by the plunger, a pivoted lever provided with a shoulder normally arranged in the path of the said dog, but adapted to swing laterally to permit the dog to ride past the shoulder when operated, the said dog and shoulder operating to lock the plunger against rearward movement when moved less than its entire distance, and a pivoted member operating to guide the dog past the said shoulder when the plunger has been moved its entire distance.

26. In a control mechanism for a machine of the class described, the combination of a plunger, lock and release means for said plunger, a dog carried by the plunger, a pivoted lever provided with a shoulder normally arranged in the path of the said dog, but adapted to swing laterally to permit the dog to ride past the shoulder when operated, the said dog and shoulder operating to lock the plunger against rearward movement when moved less than its entire distance, and a pivoted member provided with a cam operating to guide the dog past the said shoulder when the plunger has been moved its entire distance.

27. In a machine of the class described, the combination of a delivery mechanism, a member for controlling the said delivery mechanism, a device arranged to lock and release said member, a plunger, means interposed between the plunger and the device for operating the latter, and means for preventing the movement of the said member more than a predetermined distance when the device is released therefrom.

28. In a machine of the class described, the combination of a delivery mechanism, a member for controlling the said delivery mechanism, a device arranged to lock and release said member, a plunger, means interposed between the plunger and the device for operating the latter, and means controlled by the said device for preventing the movement of the said member more than a predetermined distance when the device is released therefrom.

29. In a machine of the class described, the combination of a delivery mechanism, a ratchet wheel arranged to control the said delivery mechanism, a pawl adapted to engage with and lock the said ratchet wheel, a plunger, means interposed between the plunger and the pawl for operating the latter when the plunger is operated, and a lever operated by the said pawl and provided with a lug which is thrown into the path of the teeth of the said ratchet wheel to prevent the rotation of the latter beyond a predetermined distance when the pawl is out of engagement with the teeth of the said ratchet wheel.

30. The combination of a delivery mechanism, a plunger for operating said mechanism, lock and release mechanism interposed between said plunger and said delivery mechanism, means for locking the plunger against movement in the rearward direction when moved forwardly less than its full stroke, and means for preventing movement of said delivery mechanism more than a predetermined distance when the plunger is operated.

31. The combination of a delivery mechanism having a rotary locking member, a pawl for locking said member, a plunger for operating said delivery mechanism, means for releasing said pawl when the plunger is operated, means for locking the plunger against movement in the rearward direction when moved forwardly less than its full stroke, and means for preventing movement of said rotary member more than a predetermined distance when the pawl is disengaged therefrom.

32. The combination of a feed wheel for a strip of material, movable devices carried by said wheel and provided with strip engaging members extending through the periphery of the wheel and movable circumferentially thereof, means within the wheel for moving the devices in one direction, means outside of the wheel for moving the devices in the opposite direction, and means for rotating said wheel.

33. The combination of a feed wheel for a strip of material, movable devices carried by said wheel and provided with strip engaging members extending through the periphery of the wheel and movable circumferentially thereof, means within the wheel for moving the devices in one direction, means outside of the wheel for moving the devices in the opposite direction, means for rotating said wheel, and means for adjusting one of said means.

34. The combination of a feed wheel for a strip of material, movable devices carried by said wheel and provided with strip engaging members extending through the periphery of the wheel and movable circumferentially thereof, stationary means within the wheel for moving the devices in one direction, stationary means outside of the wheel for moving the devices in the opposite direction, and means for rotating said wheel.

35. In mechanism of the class described, the combination of a delivery wheel for a strip of material, means for delivering a strip of material to the circumferential surface of said wheel, stationary guide means arranged in juxtaposition to the circumference of said wheel, and devices carried by the wheel and coöperating with said guide means for moving the strip with the wheel, said devices being movable relative to the rim of the wheel in a direction substantially circumferentially thereof to engage the strip.

36. In mechanism of the class described, the combination of a delivery wheel for a strip of material, means for delivering a strip of material to the circumferential surface of said wheel, stationary guide means arranged in juxtaposition to the circumference of said wheel, devices carried by the wheel and coöperating with said guide means for moving the strip with the wheel, said devices being movable relative to the rim of the wheel in a direction substantially circumferentially thereof to engage the strip, and means for separating the strip from the wheel.

37. In mechanism of the class described, the combination of a delivery wheel for a strip of material, means for delivering a strip of material to the circumferential surface of said wheel, stationary guide means arranged in juxtaposition to the circumference of said wheel, movable devices carried by the wheel and coöperating with said guide means for moving the strip with the wheel, means for separating the strip from the wheel, and means for moving the wheel predetermined distances.

38. In mechanism of the class described, the combination of a wheel for feeding forward a strip of material, means for delivering a strip of material to the circumferential surface of said wheel, means for separating the strip from the wheel, stationary means arranged in juxtaposition to the circumference of said wheel and between the strip delivery and separating means for guiding the strip while being fed forwardly, and devices carried by the wheel and coöperating with said guide means for moving the strip with the wheel, said devices being movable relative to the rim of the wheel in a direction substantially circumferentially thereof to engage the strip.

39. In mechanism of the class described, the combination of a delivery wheel for a strip of material, means for delivering a strip of material to the circumferential surface of said wheel, stationary guide means arranged in juxtaposition to the circumference of said wheel, devices carried by the wheel and coöperating with said guide means for moving the strip with the wheel, said devices being movable relative to the rim of the wheel in a direction substantially circumferentially thereof to engage the strip, and cam means for operating said devices in one direction.

40. In a machine of the character described, the combination of a wheel adapted to feed a strip of material forwardly, means for delivering a strip of material to the circumferential surface of said wheel, a series of devices pivotally mounted on said wheel and spaced therearound intermediate its rim and axis, the rim of said wheel being formed with openings through which said devices extend, and means for operating each of said devices whereby its free end moves substantially circumferentially of the rim of the wheel, for engagement with the strip of material.

41. In a machine of the character described, the combination of a wheel adapted to feed a strip of material forwardly, means for delivering a strip of material to the circumferential surface of said wheel, a series of devices pivotally mounted on said wheel and spaced therearound intermediate its rim and axis, the rim of said wheel being formed with openings through which said devices extend, and cam means for moving said devices successively at a predetermined position, whereby their free ends move substantially circumferentially of the rim of the wheel, for engagement with the strip of material.

42. In a machine of the character described, the combination of a wheel adapted to feed a strip of material forwardly, means for delivering a strip of material to the circumferential surface of said wheel, a series of devices pivotally mounted on said wheel and spaced therearound intermediate its rim and axis, the rim of said wheel being formed with openings through which said devices extend, means for moving said devices in one direction and cam means for moving said devices in the opposite direction at a predetermined position whereby their free ends move substantially circumferentially of the rim of the wheel, for engagement with the strip of material.

43. In a machine of the character described, the combination of a wheel adapted to feed a strip of material forwardly, means for delivering a strip of material to the circumferential surface of said wheel, a series of devices pivotally mounted on said wheel and spaced therearound intermediate its rim and axis, the rim of said wheel being formed with openings through which the free ends of said devices extend and engage with the strip of material, means normally tending to swing said devices to move their free ends substantially circumferentially of the wheel to one end of the openings in the up-run side thereof, and cam means for operating said devices at a predetermined position to move their free ends substantially circumferentially of the wheel to the opposite ends of the openings.

44. In a machine of the character described, the combination of a wheel adapted to feed a strip of material forwardly, means for delivering a strip of material to the circumferential surface of said wheel, a series of devices pivotally mounted on said wheel and spaced therearound intermediate its rim and axis, the rim of said wheel being formed with openings through which the free ends of said devices extend and engage with the strip of material, means normally tending to move said devices to one end of the openings on the up-run side of said wheel, cam means for moving said devices at a predetermined position to the opposite ends of the openings, the said cam being stationary and surrounding the axis on which said wheel rotates.

45. In a machine of the character described, the combination of a wheel adapted to feed a strip of material forwardly, means for delivering a strip of material to the circumferential surface of said wheel, a series of devices pivotally mounted on said wheel and spaced therearound intermediate its rim and axis, the rim of said wheel being formed with openings through which the free ends of said devices extend and engage with the strip of material, means normally tending to move said devices to one end of the openings on the up-run side of said wheel, cam means for moving said devices at a predetermined position to the opposite ends of the openings, and means for adjusting said cam angularly relative to the axis of said wheel.

46. The combination of supporting means for a roll of strip material formed with lines of perforations, said means permitting the strip to be drawn freely from said roll, a wheel to which the strip is delivered, arranged to feed forwardly the strip of material, means for maintaining the strip in engagement with the circumferential surface of said wheel whereby the strip moves therewith, said means including a series of devices pivotally mounted on said wheel, the free ends of said devices extending through openings formed in the rim of said wheel and normally maintained in uniform spaced relationship to each other therearound during a portion of the travel of said wheel, and means for moving said devices on their pivots at predetermined positions rearwardly and forwardly, whereby the free ends thereof move substantially circumferentially of the rim of said wheel and into engagement with the walls of the perforations formed in the strip.

47. The combination of supporting means for a roll of strip material formed with lines of perforations, said means permitting the strip to be drawn freely from said roll, a wheel to which the strip is delivered, arranged to feed forwardly the strip of material, means for maintaining the strip in engagement with the circumferential surface of said wheel whereby the strip moves therewith, said means including a series of devices pivotally mounted on said wheel, the free ends of said devices extending through openings formed in the rim of said wheel and normally maintained in uniform spaced relationship to each other therearound during a portion of the travel of said wheel, and means for moving said devices on their pivots at predetermined positions rearwardly and forwardly, whereby the free ends thereof move substantially circumferentially of the rim of said wheel and into engagement with the walls of the perforations formed in the strip, the forward movement of said devices being effected opposite the delivery position of the strip to said wheel.

48. The combination of supporting means for a roll of strip material formed with lines of perforations, said means permitting the strip to be drawn freely from said roll, a wheel arranged to feed forwardly the strip of material, means for delivering the strip to the wheel, means for separating the strip from the wheel, means for maintaining the strip in engagement with the circumferential surface of said wheel whereby the strip moves therewith, said means including a series of devices pivotally mounted on said wheel, the free ends of said devices extending through openings formed in the rim of said wheel and normally maintained in uniform spaced relationship to each other therearound during travel from said strip delivery means to said strip separating means, and means for moving said devices on their pivots at predetermined positions rearwardly and forwardly, whereby the free ends thereof move substantially circumferentially of the rim of said wheel and into engagement with the walls of the perforations formed in the strip.

49. The combination of supporting means for a roll of strip material formed with lines of perforations, said means permitting the strip to be drawn freely from said roll, a wheel arranged to feed forwardly the strip of material, means for delivering the strip to the wheel, means for separating the strip from the wheel, means for maintaining the strip in engagement with the circumferential surface of said wheel whereby the strip moves therewith, said means including a series of devices pivotally mounted on said wheel, the free ends of said devices extending through openings formed in the rim of said wheel and normally maintained in uniform spaced relationship to each other therearound during travel from said strip delivery means to said strip separating means, means for moving said devices on their pivots rearwardly and forwardly at predetermined positions, whereby the free ends thereof move relative to the rim of said wheel and into engagement with the walls of the perforations formed in the strip, and tensioning devices between said supporting means and said strip delivery means.

50. The combination of a wheel adapted to feed forwardly a strip of material, devices pivotally mounted upon said wheel and uniformly spaced around its axis, said devices extending through openings formed in the periphery of said wheel and arranged to engage the strip of material on said wheel, said devices being weighted at one end whereby they swing in one direction as they move upwardly about the axis of said wheel, and means for moving said devices in the opposite direction at a predetermined position.

51. The combination of a wheel adapted to feed forwardly a strip of material, devices pivotally mounted upon said wheel and uniformly spaced around its axis, said devices extending through openings formed in the periphery of said wheel and arranged to engage the strip of material on said wheel, said devices being weighted at one end whereby they swing in one direction as they move upwardly about the axis of said wheel, and means for moving said devices successively in the opposite direction at a predetermined position.

52. The combination of a wheel for delivering a section or sections of a strip of material, means for operating said wheel predetermined distances, means for supplying a strip to the periphery of the wheel, and spaced devices carried by the wheel and movable substantially circumferentially of the periphery thereof to engage the ends of the sections to control their positioning on the periphery of the wheel and the delivery of a complete section or sections by said wheel.

53. The combination of a wheel adapted to feed forwardly a strip of material, means for rotating said wheel step by step, devices carried thereby and arranged to extend through the periphery of said wheel, the free ends of said devices being arranged to move substantially circumferentially of the wheel into engagement with the strip of material and prevent relative movement thereof circumferentially of the wheel during movement of the latter.

In testimony whereof I affix my signature, in the presence of two witnesses.

CHARLES FRANCIS RICHARDSON.

Witnesses:
    EUGENE E. BASQUIN,
    ROY J. SOULER.